US007982116B2

(12) United States Patent
Okamoto

(10) Patent No.: US 7,982,116 B2
(45) Date of Patent: Jul. 19, 2011

(54) ELECTRONIC MUSIC APPARATUS WITH DATA LOADING ASSIST

(75) Inventor: Tetsuo Okamoto, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 11/748,458

(22) Filed: May 14, 2007

(65) Prior Publication Data

US 2007/0214181 A1 Sep. 13, 2007

Related U.S. Application Data

(62) Division of application No. 11/375,664, filed on Mar. 14, 2006.

(30) Foreign Application Priority Data

Mar. 17, 2005 (JP) ................................ 2005-076434
Mar. 17, 2005 (JP) ................................ 2005-076435

(51) Int. Cl.
*G10H 7/00* (2006.01)
*G06F 17/00* (2006.01)

(52) U.S. Cl. ......................................... 84/604; 707/689

(58) Field of Classification Search .................. 707/1, 3, 707/104.1, 200, 689; 84/604
See application file for complete search history.

(56) References Cited

U.S. PATENT DOCUMENTS 5,073,927 A * 12/1991 Grube ........................ 348/14.01
5,864,868 A 1/1999 Contois
6,852,918 B2 2/2005 Kondo et al.
2002/0002039 A1 * 1/2002 Qureshey et al. ............. 455/344
2002/0116399 A1 * 8/2002 Camps et al. ................ 707/200
2002/0150391 A1 10/2002 Hara
2002/0157036 A1 10/2002 Nakamura
2004/0057348 A1 * 3/2004 Shteyn et al. .............. 369/30.38
2004/0193798 A1 9/2004 Kuwamura
2004/0236568 A1 * 11/2004 Guillen et al. ................ 704/201
2006/0059204 A1 * 3/2006 Borthakur et al. ............ 707/200

FOREIGN PATENT DOCUMENTS

JP 3-231335 A 10/1991
JP 08-248961 A 9/1996
JP 2002-258848 A 9/2002
JP 2002-259174 A 9/2002
JP 2002-312209 A 10/2002

OTHER PUBLICATIONS

Notice of Reason for Rejection dated Mar. 3, 2009 issued in corresponding JP Application No. 2005-076435, with English translation.
Notification of Reasons for Rejection issued in corresponding Japanese application: 2005-076434, dated Dec. 2, 2008.
Decision of Rejection issued in corresponding Japanese Patent Application No. 2005-076435 dated May 19, 2009.

* cited by examiner

*Primary Examiner* — Jeffrey Donels
*Assistant Examiner* — Andrew R Millikin
(74) *Attorney, Agent, or Firm* — Rossi, Kimms & McDowell LLP

(57) ABSTRACT

An electronic music apparatus has a sound generator for generating a music sound signal according to music data. A storage medium stores music data files, each written with music data for generating the sound signal. An information retention section retains file information for displaying a name or an icon of the respective music data. A reading command section issues a command of reading a target music data file from the storage medium. A display control section controls a display device to display, when the target music data file is successfully read out, the name and the icon of the music data written in the read target music data file, and when the target music data file is not read, to display the name and the icon of the music data in a state different from the name and the icon displayed when the target music data file is successfully read.

3 Claims, 7 Drawing Sheets

ELECTRONIC MUSIC APPARATUS WITH DATA LOADING ASSIST

This is a divisional application of U.S. patent application Ser. No. 11/375,664 filed Mar. 14, 2006.

BACKGROUND OF THE INVENTION

1. Technical Field

This invention relates to an electronic music apparatus that loads music data files from a storage medium.

2. Background Art

Conventionally, some electronic music apparatus exemplified by an electronic musical instrument is designed for treating timbre and timbre data called “voice”, and is provided with a user voice (called also as custom voice) function of allowing users to freely enter voice parameters and waveforms in addition to a preset voice (preset timbre) that has been preset to the electronic music apparatus in advance. For example, in an electronic musical instrument described in Japanese Patent Application Laid-open No. 08-248961, user voice data (user-set timbre data) entered by the user voice function can be stored in external storage media such as flexible disks (FDs).

As such, when the user voice data is stored in an external storage medium attached to an electronic music apparatus, reading information that specifies user data read out from the external storage medium at the time of loading the user voice data stored in the external storage medium is reserved in advance in a memory of the main body of the electronic music apparatus. Next time, the user voice data is read in accordance with this reading information, whereby it can restore the loading state of the user voice data, and it can serve as a very convenient tool.

The problem here is that the reading information is sometimes inconsistent with the user voice data actually stored in the external storage medium. For example, when paths each storing the user voice data are recorded as the reading information, if the storage path of the user voice data is changed for some reasons, it results in a failure of reading the user voice data. When the reading is failed as such, with no clue indicating the user voice data failed to be read, no measure can be taken thereafter (e.g., the failed user voice data is never put into the correct path for reading again).

SUMMARY OF THE INVENTION

In consideration of such circumstances, an object of this invention is to provide an electronic music apparatus that can clearly notify users of a reading failure when music data files are read from a storage medium. Another object of this invention is to provide an electronic music apparatus that can reduce the possibility of reading failure when music data files are read from a storage medium.

With the first characteristics of this invention, provided is an electronic music apparatus having a sound generator for generating a music sound signal according to music data and a display device for displaying information associated with music data, the electronic music apparatus comprising: a storage medium that stores a plurality of music data files, each being written with music data for use in generating the music sound signal; an information retention section that retains file information for use in displaying a name or an icon of the respective music data in correspondence to the respective music data files; a reading command section that issues a command of reading out a target music data file among the plurality of the music data files from the storage medium; and a display control section that controls the display device when the target music data file is successfully read out, for displaying the name and the icon of the music data written in the read target music data file based on the file information, and that controls the display device when the target music data file is failed to be read, for displaying the name and the icon of the music data in a state different from the name and the icon displayed when the target music data file is successfully read out.

Preferably in the electronic music apparatus of this invention, the read command section operates when the music data file is failed to be read, for issuing another command of reading again the target music data file from the storage medium, and the display control section controls the display device when the target music data file is successfully read this time in response to said another command, for displaying the name and the icon of the music data based on the file information.

With the second characteristic of the invention, there is provided an electronic music apparatus having a sound generator for generating a music sound signal according to a music data file, the electronic music apparatus comprising: a storage medium that stores a plurality of music data files, each being written with music data for use in generating a music sound signal, and that stores a guide information file which is written with absolute path information and relative path information representing an absolute path and a relative path, respectively, for each of the music data files stored in the storage medium; a first search section that searches a target music data file among the plurality of the music data files in the storage medium based on the absolute path information; a path generation section that operates when the first search section fails to allocate the target music data file in the storage medium, for generating another absolute path of the target music data file based on an absolute path of the guide information file and the relative path information of the target music data file; and a second search section that searches the target music data file based on the generated absolute path.

Moreover, in the inventive electronic music apparatus, the storage medium stores the guide information file which is written with the relative path information indicting a relative path of each music data file which is determined relative to a location of the guide information file in the storage medium. Further the inventive electronic music apparatus comprises a rewriting section that rewrites the absolute path information of the target music data file by the generated absolute path.

DETAILED DESCRIPTION OF THE INVENTION

[System Overview]

Figure 1:
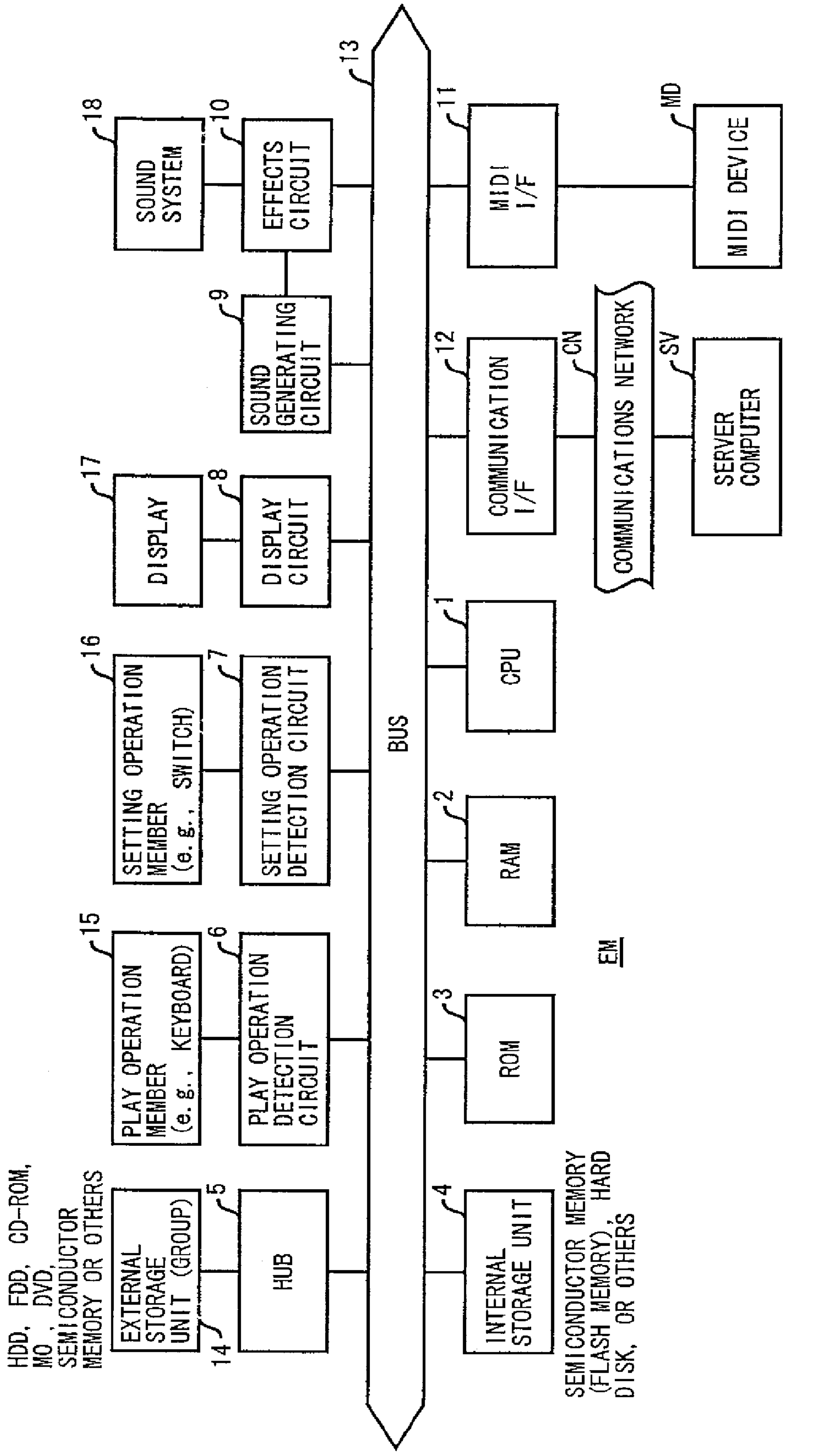
FIG. 1 is a block diagram showing the hardware configuration of an electronic music apparatus in one example of this invention.

FIG. 1 is a block diagram showing the hardware configuration of an electronic music apparatus in one example of this invention. For this electronic music apparatus (a kind of computer), exemplified is an electronic musical instrument, or a music information processing device having a music information processing function equivalent to an electronic musical instrument such as a personal computer (PC) including a play operation section and a music sound signal generation section. Such an electronic music apparatus is provided with a central processing unit (CPU) 1, a random access memory (RAM) 2, a read only memory (ROM) 3, an internal storage unit 4, a hub 5, a play operation detection circuit 6, a setting operation detection circuit 7, a display circuit 8, a sound generating circuit 9, an effects circuit 10, a MIDI interface (I/F) 11, a communications interface (I/F) 12, and others. These components 1 to 12 are connected to one another via a bus 13.

The CPU 1 exercises various controls over a music data process or others using a clock of a timer by following any predetermined control program. The RAM 2 is used as a storage region for temporarily retaining various types of data needed for such processing, or for using the data for processes. The ROM 3 is a kind of a machine readable medium containing various types of control program or others including a music data processing program needed to execute such processes. The internal storage unit 4 is a secondary storage unit incorporated inside of the electronic music apparatus EM, and is configured by flash memory, a hard disk (HD), or others.

The hub 5 is configured by a USB hub or others, and connects a plurality of external storage units 14 inside of the apparatus EM. These external storage units 14 are an external secondary storage unit, configured by an external hard disk drive (HDD), a compact disk read only memory (CD-ROM), a flexible disk (FD), a magneto-optical (MO) disk, a digital versatile disk (DVD), a semiconductor memory, or others. A data storage region of the internal storage unit 4 and the external storage unit 14 store various types of control program, various types of music data including timbre data (Vf) called "voice data", and a control program.

The play operation detection circuit 6 functions as a play operation section together with a play operation member 15 such as keyboard, and detects the play operation details of the play operation member 15, and installs its corresponding actual play data into inside of the device. The setting operation detection circuit 7 functions as a panel setting section together with the setting operation member 15 such as key switch, mouse, or others, detects the setting operation details of a setting operation member 16, and installs its corresponding panel setting data into inside of the device. The display circuit 8 is provided with RAM for display use that can store name data, icon data, or others corresponding to the music data such as voice data (timbre data), exercises control over display/illumination details of a display 17 such as LCD for screen display use and various types of indicators in accordance with a command coming from the CPU 1, and helps the display with respect to the operation of the operation members 15 and 16.

The sound generating circuit 9 generates a music sound signal in accordance with the actual play data coming from the play operation member 15, and the play data coming from the storage means (3, 4, 14), and others. The effects circuit 10 including an effects provision DSP generates a music sound signal derived by providing any predetermined effects to the music sound signal coming from the sound generating circuit 9. These circuits 9 and 10 altogether function as a music sound signal generation section, and are referred also to as sound generating sections. A sound system 18 that is connected to the stage subsequent to the effects circuit 10 is provided with a D/A conversion section, an amplifier, and a speaker, and generates music sounds based on the effects-provided music sound signal.

The MIDI I/F 11 is connected with other MIDI music equipment MD, and the MIDI play data is exchanged between the electronic music apparatus EM and the other music equipment MD for use by the electronic music apparatus EM. The communications I/F 12 is connected with a communications network CN such as the Internet or a local area network (LAN), and a control program may be downloaded from any external server computer SV or others, or the play data may be stored in the storage units 4 and 14 for use by the electronic music apparatus EM.

Figure 2:
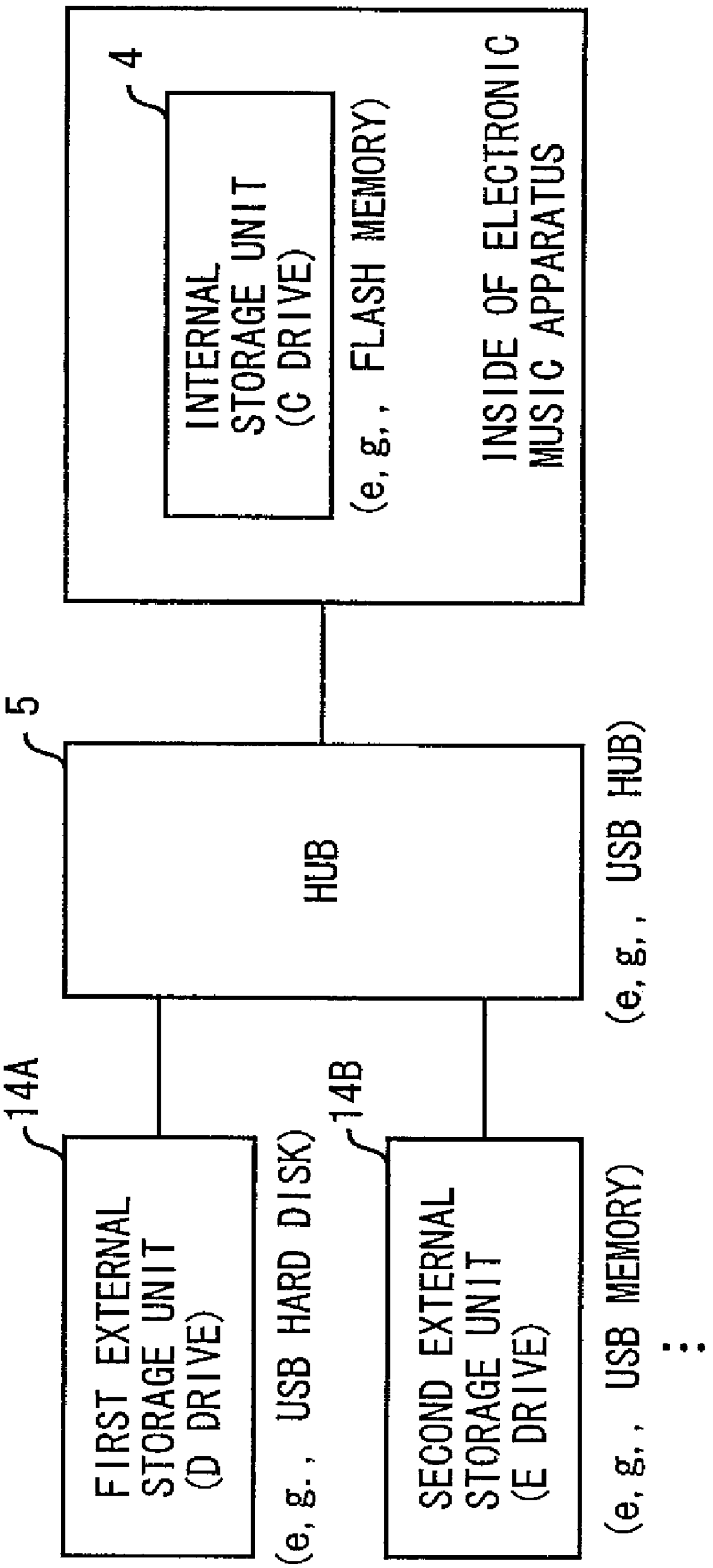
FIG. 2 is a diagram showing an exemplary configuration of a storage unit in one example of this invention.

FIG. 2 shows an exemplary configuration of the storage unit in one example of this invention. The internal storage unit 4 inside of the electronic music apparatus EM is configured by flash memory, a hard disk, or others, and for example, is assigned with a drive letter "C" representing a route directory by an absolute path, and is referred to as a drive name such as "C drive". On the other hand, the external storage unit group 14 is configured by external secondary storage units including a first external storage unit 14A, a second external storage unit 14B, and others. These external storage units 14A, 14B, and others are connected to inside of the electronic music apparatus EM via the hub 5.

The first and second external storage units 14A and 14B are USB hard disks or USB memories connected through an USB interface, for example, and in accordance therewith, the hub 5 is configured by a USB hub. With this being the case, the USB hard disk is first connected to the hub 5 as the first external storage unit 14A, and then the USB memory is connected thereto as the second external storage unit 14B. As a result, the USB hard disk 14A is assigned with a drive letter "D", and is referred to as "D drive". On the other hand, the USB memory 14B is assigned with a drive letter "E", and is referred to as "E drive". Therefore, the memories (external storage units) 14A and 14B are represented by the route directories "D" and "E", respectively, by the absolute path.

[Voice Data (Music Data) Configuration]

Figure 3:
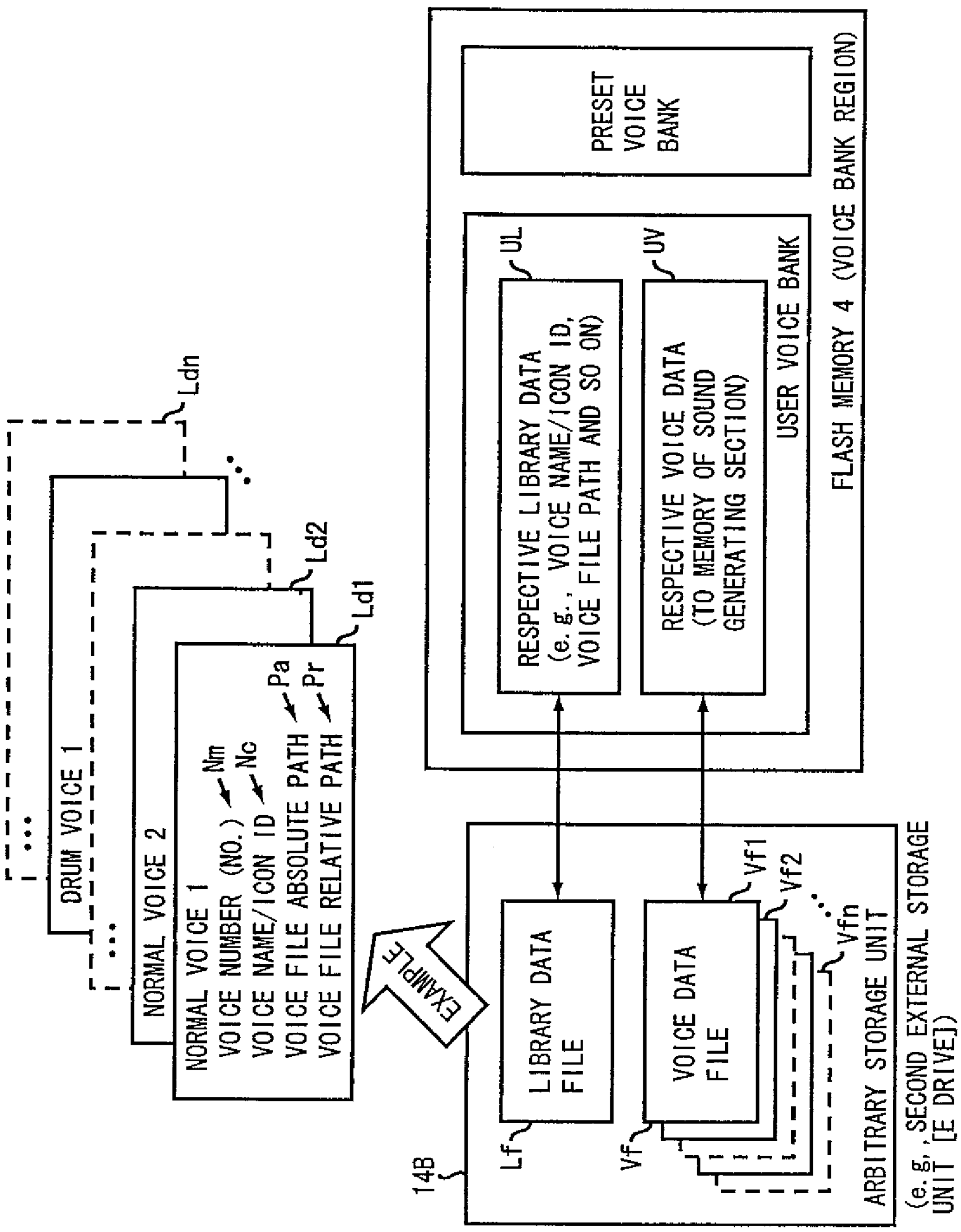
FIG. 3 is a diagram showing an exemplary configuration of voice data in one example of this invention.

With the electronic music apparatus in one example of this invention, if a user creates his or her own user voice data (timbre data) data as a part of the music data for use in generating music sound signals, the resulting user voice data is stored in any arbitrary secondary storage unit as a voice data file. In accordance therewith, a library data file including path information of the voice data file is stored in the secondary storage unit, and whenever needed, the file can be read into a voice data bank utilizing the path information. FIG. 3 shows an exemplary configuration of the voice data in one example of this invention. Moreover, the internal storage unit 4 is presumed to be flash memory.

The voice (timbre) bank of the electronic music apparatus EM is configured by a preset voice bank including preset voice data of a plurality of sets, and a user voice bank including user voice data also of a plurality of sets. Through selection of these voice banks, the voice data of any desired set can be used in the sound generating sections 9 to 10. The preset voice bank is stored in a vice bank region of the flash memory 4 (with FIG. 3 example), or the ROM 2, and the preset voice data included in the preset voice bank is the timbre data which have been set to the electronic music apparatus EM in advance. The user voice bank is stored in the voice bank region of the flash memory 4, and the timbre data created by the user can be entered into a voice data area UV of the use voice bank as the user voice data. For example, in correspondence with the preset voice data, the user voice data may be a combination of 128 sets relating to the normal voice (normal timbre) with respect to music scale and 10 timbres relating to the drum voice with respect to drum sound.

The user voice data of the respective sets to be entered into the user voice bank is configured only by parameters for controlling the timbre of the music sound signal, or configured by "parameter+waveform data" by adding waveform data to these parameters. With only parameters, the waveform data for use is the one that has been preset, and with "parameter+waveform data", any desired waveform data can be advantageously used.

The user voice data entered in the user voice bank is partially or entirely stored (saved) in any arbitrary drive in the secondary storage units 4 and 14 (14A, 14B, and others) such as a music data storage region of the internal storage unit (flash memory) 4. At this time, the user voice data of the respective sets entered in the voice data area UV is saved as each voice data file (also simply referred to as "voice file") Vf; Vf1 to Vfn. In accordance therewith, to the library data area UL in the user voice bank, library data (Ld1 to Ldn) is created for guiding the data source storage locations or positions of the voice data files Vf1 to Vfn, and the file information such as file name is also saved in the library data file Lf.

The user voice data of the saved voice data files Vf can be loaded (read) again into the user voice bank of the electronic music apparatus EM. At this time, first of all, the library data file Lf is loaded, and the library data is written to the library data area UL of the flash memory 4. Thereafter, in accordance with the path information written in the library data, any corresponding voice data files Vf are each read into the voice data area UV of the user voice bank. From thus read voice data, the voice data selected through user operation is written to the memories of the sound generating sections 9 to 10 for use in generation of the music sound signals.

In FIG. 3 example, used as a drive as a data source is the second external storage unit (USB memory 14B) of the E drive, and the USB memory stores the voice data files Vf1 to Vfn (the reference sign "Vf" is used when they are collectively referred to) of a plurality of (n) sets, and a piece of library data file Lf. The voice data files Vf1 to Vfn represent the details of the user voice data of the respective sets created by the user, and as exemplarily shown in the upper portion of FIG. 3, the library data file Lf is configured by a plurality of library data Ld1 to Ldn corresponding to these voice data files Vf1 to Vfn, respectively.

The library data Ld1 to Ldn each include header information, a voice number (No.) Nm, file name information Nc, a voice file absolute path Pa, a voice file relative path Pr, and the like about the respective voice data files (voice files) Vf1 to Vfn savedin the drive (E). Herein, the header information ("normal voice 1", "normal voice 2", . . . , "drum voice 1", and others) of a specific piece of library data Ldi [i($1 \leqq i \leqq n$) represents any arbitrary number] represents the voice category of the corresponding voice data file Vfi, and is named for user acknowledgement to allow specification in the voice file group Vf. The information to be recorded after the header information is as follows.

The voice number Nm is a unique voice (timbre) number in the electronic music apparatus EM in its entirety for specifying the corresponding voice file Vfi.

Figure 5:
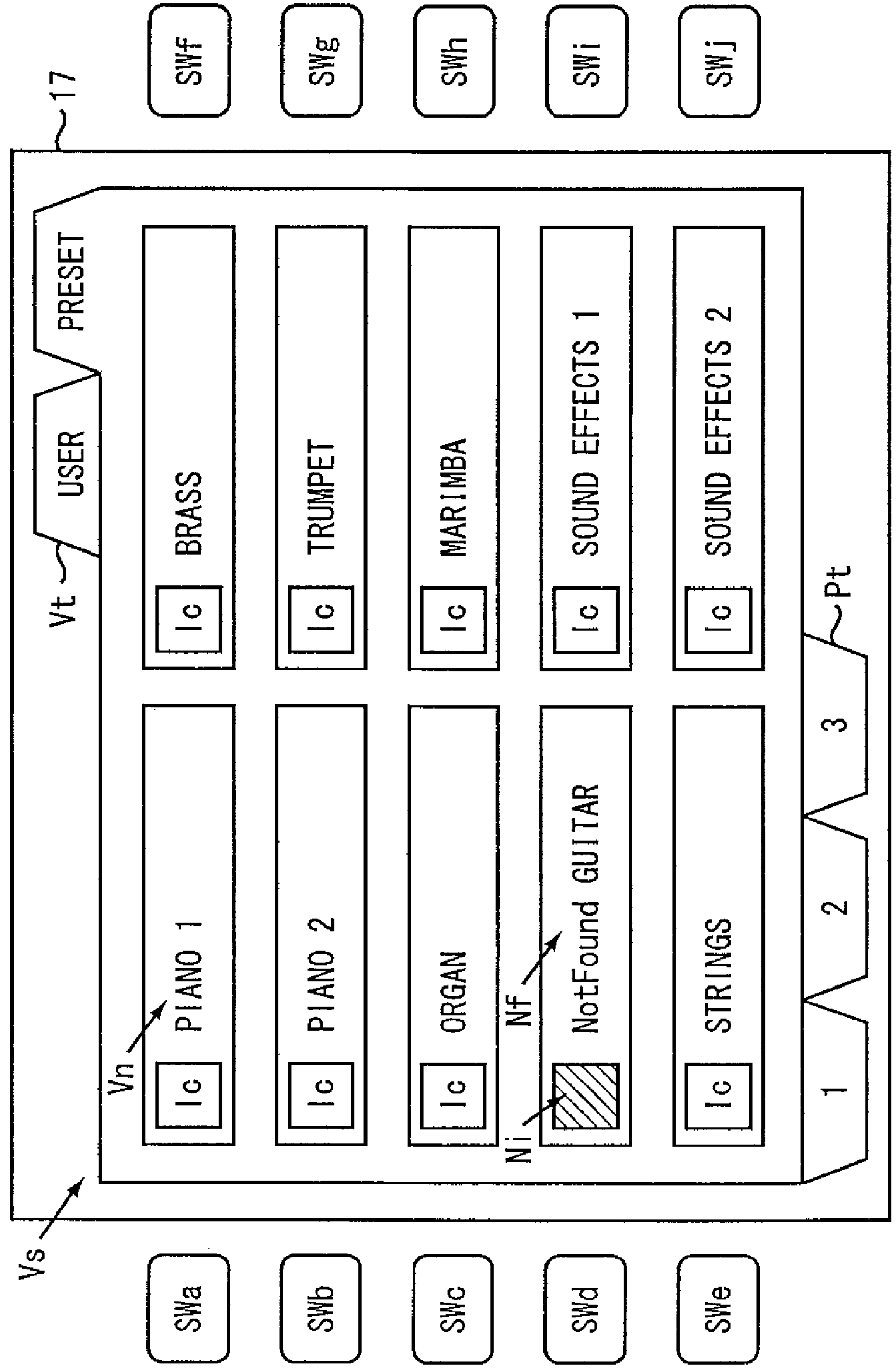
FIG. 5 is a diagram showing an exemplary voice display screen in the electronic music apparatus in one example of this invention.

The file name information ("voice name/icon ID") Nc has the data configuration of "voice name. icon ID. extension", and when the overview of the voice data is displayed on the display 17 of the electronic music apparatus EM using a voice display screen (FIG. 5: Vs), the voice name to be displayed on the voice display screen is specified from the "voice name" in the file name information Nc, and the icon to be displayed in the vicinity of the display area of the voice name on the voice display screen is specified from the "icon ID" in the file name information Nc. For example, the voice display screen displays, based on the "voice name", any corresponding voice name such as "piano 1", "piano 2", "organ", and others. Moreover, based on the "icon ID", the voice display screen correspondingly displays a picture icon of a piano in the vicinity of the display of piano voice in response to the "voice name", for example.

What is more, in accordance with one of the characteristics of this invention, as to the voice file absolute path Pa and the voice file relative path Pr, the path of any voice data file (voice file) Vfi is provided with both of an absolute path and a relative path. That is, as the path information for the voice file Vfi, the library data Ldi prescribes the voice file absolute path Pa written with the path of the voice file Vfi using as a reference (route directory) the data source drive letter ("E" in this example) of the voice file Vfi, and the voice file relative path Pr written with the path of the voice file Vfi using as reference the level of the library data file Lf. Stated otherwise, the relative path Pr describes the hierarchical relation between the voice file Vfi and the library data file Rf.

Herein, by referring to FIG. 3, one of the characteristics about music data loading of the electronic music apparatus in one example of this invention is described as below. In this electronic music apparatus EM, when a plurality of music data (voice data) files Vf; Vf1 to Vfn written with the music data for use in generation of music sound signals such as user voice data are stored in any arbitrary storage medium 14B ("E"). Guide information (library data) file Lf including file information Ldt to Ldn written with both the absolute path Pa and the relative path Pr of the music data files Vf1 to Vfn is stored in the data source storage medium 14B. When any desired music data file Vfi ($1 \leqq i \leqq n$) is read, first of all, the music data file Vf1 is searched using the absolute path Pa of the guide information file Lf. If not found by the absolute path Pa, the music data file Vfi is searched again using this time a new absolute path which is generated using the relative path Pr of the guide information file Lf and the absolute path of the guide information file Lf itself including the drive letter of the data source storage medium 14B (path of the file Lf with the route directory of "E").

(Absolute Path and Relative Path)

Figure 4:
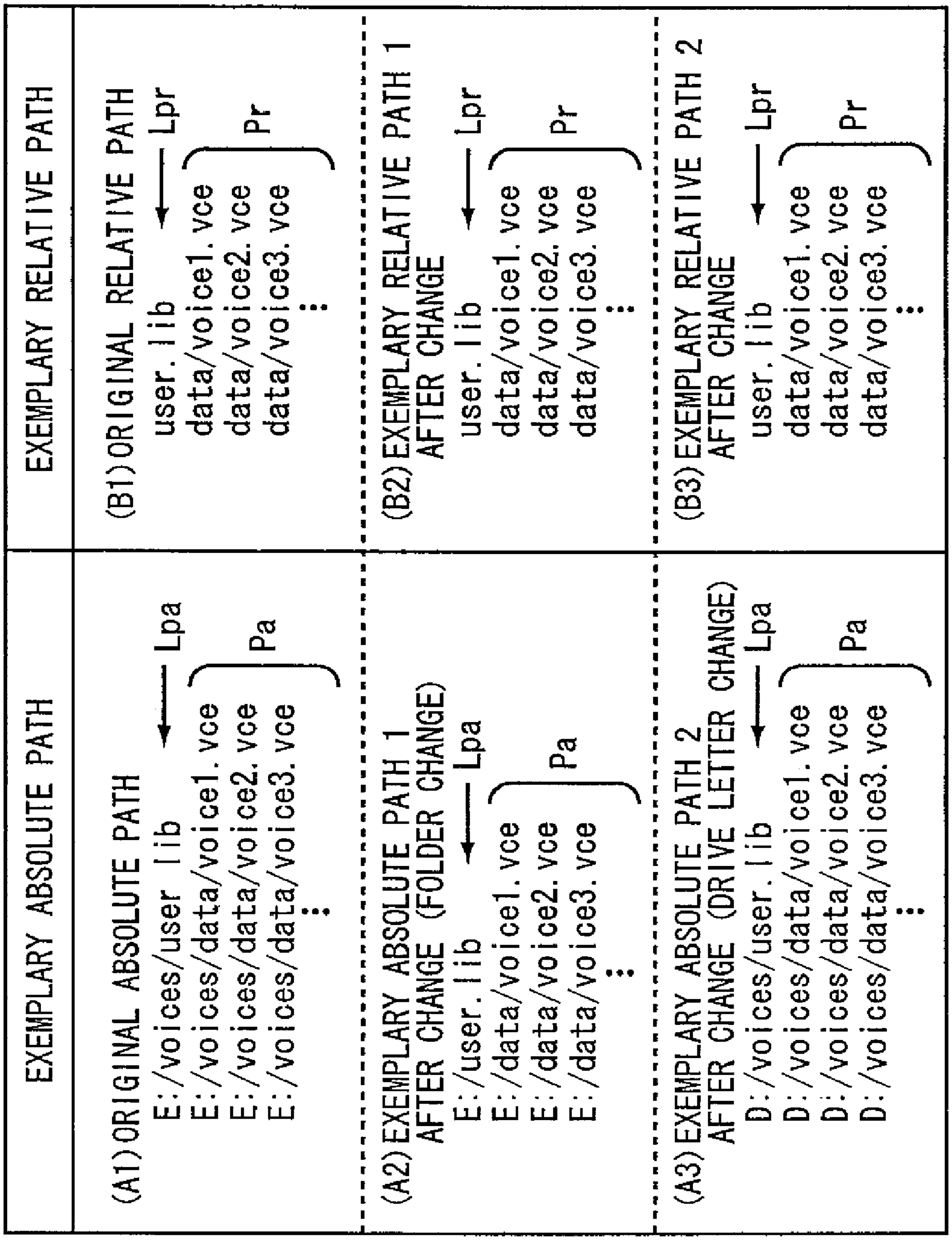
FIG. 4 is a diagram for illustrating exemplary absolute path and relative path of a voice file.

FIG. 4 shows exemplary absolute path and relative path, and in relation to FIG. 3 example, FIG. 4 (A1) and (B1) show exemplary path information when the voice data file Vf and the library data file Lf are stored in the second external storage unit (E drive) 14B. The library data file Lf represented as "user.lib" is stored in a "voices" folder, and the absolute path Lpa thereof is indicated in the first line of FIG. 4 (A1). Moreover, the voice data files Vf1, Vf2, and others represented as "voice1.vce", "voice2.vce" and others are stored in a "data" folder in the lower hierarchy of the "voices" folder, and their absolute path is indicated by the path information in the second line and lower lines of FIG. 4 (A1), and these path information is written in the library data file Lf as the voice file absolute path Pa.

On the other hand, the relative path Lpr of the library data file Lf is indicated in the first line of FIG. 4 (B1) with reference to the hierarchy of the library data file Lf. The relative path of each of the voice data files Vf1, Vf2, and others is indicated by the relative path information that is indicated in the second line and lower lines of FIG. 4 (B1) with reference to the "data" folder being the same directory hierarchy (level) as the library data file Lf, and these path information is written in the library data file Lf as the voice file relative path Pr.

Using the absolute path Pa increases the access speed to the voice data files VF, and can reduce the load processing time of the voice data file VF. However, if any path change is made to the voice data file VF, e.g., the folder storing the voice data file VF is changed in position between any two adjacent levels of hierarchies or in the same hierarchy, or the storage unit storing the voice data file VF is changed in drive letter, the voice file cannot be allocated by it original absolute path.

To be specific, in FIG. 4 (A1) example, when the "data" folder storing the library data file Lf and the voice data file VF is changed in position from the lower of the "voices" folder to directly below the E drive, and thus the hierarchy of data storage rises by one level. If this is the case, the absolute paths Lpa and Pa of the files Lf and VF respectively are changed as shown in FIG. 4(A2).

Moreover, for example, after the voice data file VF and the library data file Lf are stored in the USB memory having been serving as the second external storage unit 14B, the USB memory is once removed from the USB hub 5 together with the USB hard disk having been serving as the first external storage unit 14A, and the USB memory is first connected to the USB hub 5. As a result, the electronic music apparatus EM acknowledges the USB memory as the first external storage unit 14A. Accordingly, the drive letter of the USB memory storing the files VF and Lf is changed from "E" to "D", and the absolute paths Lpa and Pa of the files VF and Lf are changed as shown in FIG. 4 (A3).

On the other hand, as to the relative paths Lpr and Pr of the library data file Lf and the voice data file VF respectively as shown in FIG. 4 (B1), even if a path change is made to the voice data file VF as described above, the path information is not changed in details as far as the relative paths Lpr and Pr of FIG. 4 (B2) and (B3) are concerned. Therefore, using the relative path increases the chances of allocating the voice data file VF no matter if the absolute path of the voice data file VF is changed. By finding the right path for allocation of the voice file, the possibilities of access failure can be reduced to a greater degree even though accessing to the voice data file VF may take some time.

In one example of this invention, adopted are the principles of first searching the voice data file VF using the voice file absolute path Pa, and if not found, searching the voice data file VF again using this time the voice file relative path Pr. Note that in order to allocate the voice data file VF using the voice file relative path, the folder (referred also to as directory) storing the voice data file Vf is required to be the same folder as the library data file, or to be a folder located lower thereto. Namely, the storage medium stores the library data file (namely, guide information file) which is written with the relative path information indicting a relative path of each voice data file (namely, music data file), which is determined relative to a location of the guide information file in the storage medium.

(Voice Display Screen)

With the electronic music apparatus in one example of this invention, at the time of reading the user voice data of the voice data file stored in the secondary storage unit, if the path of the voice data file is not found, a display state of the voice name or icon of the target user voice data is changed on the voice display screen, thereby notifying the user that no file path is found. FIG. 5 shows an exemplary voice display screen to be displayed on the display of the electronic music apparatus in one example of this invention.

In this exemplary voice display screen Vs, the icon Ic and the voice name Vn are displayed for the voice data stored in the user voice bank and the preset voice bank so that the user can be notified of the overview of the user and preset voice data. Through operation of a voice tab Vt displayed on the upper portion of the screen Vs, the user voice and the preset voice can be switched in display, and through operation of a page tab Pt on the lower portion thereof, the voice pages can be switched.

In order to load the voice data files Vf; Vf1 to Vfn stored in any arbitrary storage unit 4, 14; 14A, 14B, and others into the user voice bank, the voice display screen Vs is displayed. With this being the case, a reference is made to the library data Ld1 to Ldn written in the library data area UL, and based on the "voice name" and "icon ID" of the respective file name information Nc, the voice name Vn is displayed such as "piano 1", "piano 2", "organ", "guitar", and others, and the icon IC of the corresponding image is displayed in the vicinity thereof.

In this case, the voice data file Vfi to be loaded is searched using the voice file path information Pa and Pr of the corresponding library data Ldi, and if this search fails in finding the data source of the target voice data file Vfi, the voice name is changed to a special voice name Nf called "NotFound" version, configured by "NotFound"+"voice name" such as "NotFound guitar". The icon to be displayed in the vicinity of the voice name display region is changed to a special icon Ni called "NotFound" version indicating that no file is found as the diagonally-shaded icon of FIG. 5.

Herein, as already described, such a case of failing in finding any desired voice data file possibly occurs when the user makes a change to the folder arrangement in which the relative relationship between the library data file and the voice data file is changed, or when the voice data file itself is deleted, or others.

Note that the display Nf and Ni in the "NotFound" version is put back to the normal display of the voice name Vn and the icon Ic if the voice data file is correctly loaded thereafter by the reload process (FIG. 7) executed on the voice data file.

Moreover, when the voice data is stored in the preset voice bank, by the user operating selection switches SWa to SWj that are provided in the vicinity of a side portion of the display 17, and are corresponding to the voice display Vn and Ic, the voice data is selected for storage into the memories of the sound generating sections 9 to 10. However, the user voice data to which the "NotFound" version display Nf and Ni are made is not surely selected so that the data details cannot be changed.

Herein, by referring to FIG. 5, one of the display characteristics of the electronic music apparatus in one example of this invention is briefly described as below. In this electronic music apparatus EM, a plurality of music data (voice data) files Vf; Vf1 to Vfn written with music data for use in generating music sound signals such as user voice data can be stored in any arbitrary storage device 4, 14; 14A, 14B, and others. When the music data file Vf is read out from the data source storage device 4, 14, the file information Lf; Ld1 to Ldn (Nc) for displaying the name Vn and the icon Ic indicating the details of the music data corresponding to the music data file is reserved in the file information (library data) area UL. For the music data file succeeded in reading, the name Vn and the icon Ic based on the file information Lf (Nc) are displayed. For the music data file failed in reading, the name Nf and the icon Ni are displayed in the display state referred toas "NotFound" version being different from the case of reading success.

[Library Data Load Process (Music Data Process 1)]

Figure 6:
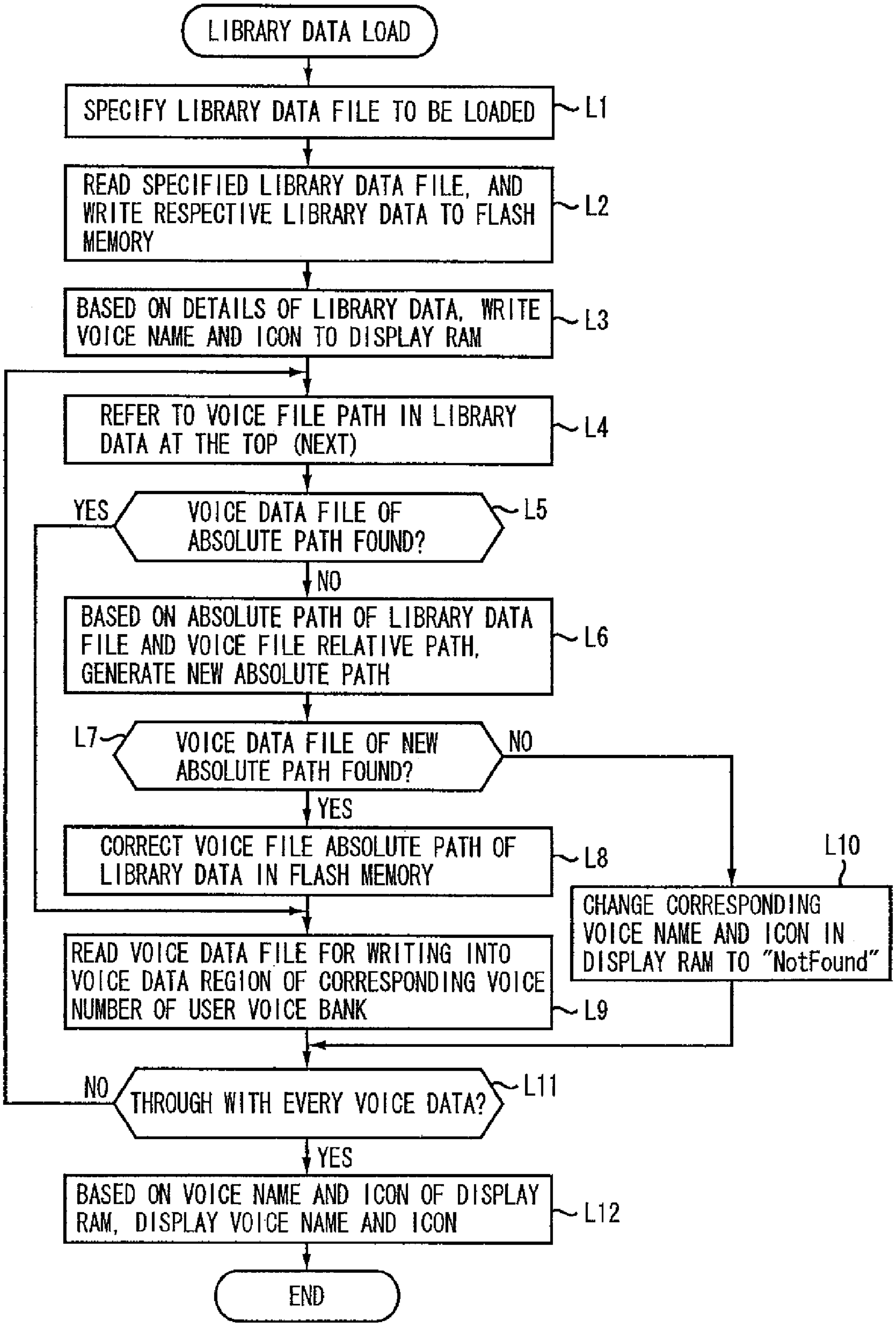
FIG. 6 is a flowchart showing the procedure of a library load process in one example of this invention.

In the electronic music apparatus in one example of this invention, a library data load process (music data process) can be executed based on the above-described principles in accordance with a music data processing program. FIG. 6 is a flowchart showing the procedure of the library data load process in one example of this invention.

This library data load process is started from a process of specifying a library data file Lf to be loaded (step L1). This file specification method includes, for example, a method of specifying any desired library data file Lf by instructing the storage unit including the library data file Lf to be loaded, and then designating the file Lf based on the user operation, and a method of storing the file information of the previously-read library data file Lf to inside of the electronic music apparatus EM, and using an auto load function of automatically specifying the storage unit and the file Lf from the file information whenever necessary, e.g., when the electronic music apparatus EM is activated. As a result of this file specification process (L1), a specification is made to the absolute path Lpa of the library data file Lf with the route directory being the drive letter of the data source storage unit of the specified file Lf.

Thereafter, the library data file Lf specified by the file specification process (L1) is read, and the library data Ld1 to Ldn of the library data file Lf is written to the library data area UL of the flash memory 4 (step L2). Thereafter, based on the details of the file name information Nc of the respective library data files Ld1 to Ldn ("voice name" and "icon ID", the RAM for display use is written with the voice name data and the icon data (step S3).

Moreover, out of the library data Ld1 to Ldn written into the library data area UL of the flash memory 4, the library data Ld1 at the head is defined as processing-target library data Ldi, and the voice file path information Pa and Pr are checked for the library data Ldi (step S4). First of all, a determination is made whether the data source of the voice data file Vfi instructed by the voice file absolute path Pa can be specified (step L5).

Here, when the voice data file Vfi cannot be specified by storage destination using the voice file absolute path Pa (L5→NO), based on the absolute path Lpa of the library data file Lf specified by the file specification process (L1) and the voice file relative path Pr written to the library data Ldi, a new absolute path is found (step L6). Thereafter, a determination is made whether the voice data file Vfi instructed by the voice file relative path Pr can be found using thus found new absolute path (step L7).

Thereafter, when the file Vfi can be found as a result of specifying the storage destination of the desired voice data file Vfi using the new absolute path (L7→YES), the new absolute path is determined as being a right path, and the voice file absolute path Pa of the library data Ldi in the flash memory 4 is corrected to the new absolute path (step L8). Namely, the inventive electronic music apparatus further comprises a rewriting section that rewrites the absolute path information of the target music data file by the generated absolute path.

When the voice data file Vf is found using the voice file absolute path Pa (L5→YES), or after the voice file absolute path Pa is corrected (L8), the user voice data of thus found voice data file Vfi is read from the storage unit, and in accordance with the voice number Nm of the library data Ldi, the reading result is written into the voice data area UV of the corresponding voice number of the user voice bank (step L9).

On the other hand, when the desired voice data file Vfi cannot be found even with the new absolute path (L7→NO), the corresponding voice name data and icon data in the RAM for display use are changed to those of the "NotFound" version (step L10).

After the user voice data writing process (L9), or after the display RAM data correction process (L10), a determination is made whether the voice data files Vf1 to Vfn instructed by the entire library data Ld1 to Ldn in the library data area UL are through with the process (step L11). Here, in the meantime when the voice data files are not yet entirely through with the process (L11→NO), the procedure returns to step L4 to determine the next library data Ldi in the library data area UL as a processing target, and the voice file path information Pa and Pr of the next library data Ldi are checked so that the above-described procedure (L4 to L11) is repeated.

If the voice data files Vf1 to Vfn are entirely through with the process (L11→YES), based on the voice name data and the icon data of the RAM for display use, the voice name and the icon are displayed on the voice display screen Vs (step L12), and this library data load process is ended.

Display of voice name and icon (L12) will be described in more detail. For example, as to the user voice data through with the user voice data writing process (L9), in accordance with the voice name data and the icon data (L4) that are originally written, the voice name is displayed on the voice name display region such as "piano 1", "piano 2", and others of FIG. 5. On the icon display region closer (closer on the left side) to the voice name display region, the corresponding icon image Ic is displayed. On the other hand, as to the voice data file that is not found and thus is applied with the display RAM data correction process (L10), in accordance with the voice name data and the icon data changed to those of the "NotFound" version, as the "NotFound guitar" of FIG. 5, the NotFound voice name Nf indicating the reading failure is displayed on the voice name display region, and on the icon display region, the corresponding NotFound icon Ni is displayed.

Note here that with a case that the voice data file Vf is not found (L7→NO), in the last display step (L12), not only the voice display screen Vs but also a screen telling as "load failure of partial or entire voice data" is displayed depending on the level of a file location failure, for example, and a warning display may be made indicating the loading has been failed. Alternatively, every time the voice data is failed in loading (L7→NO), a warning display may be made to tell the failure.

Moreover, when the voice data is found using the new absolute path (L7→YES), and when the voice file absolute path Pa of the library data is corrected (L8), the corrected library data on the flash memory 4 may be allowed to overwrite and update the library data file Lf in the data source storage unit.

[Reload Process (Music Data Process 2)]

In the electronic music apparatus in one example of this invention, if there is any voice data file failed in reading as a result of execution of the library data load process (music data process 1), as is remembering which path caused the reading failure at this point in time, the user can execute the library data load process (music data process 2) again after solving the path problem by setting a medium again, for example, or instead of starting again the library data load process, execute the reload process (music data process 2) of additionally loading again the user voice data failed in reading in the library data load process into the user voice bank.

Figure 7:
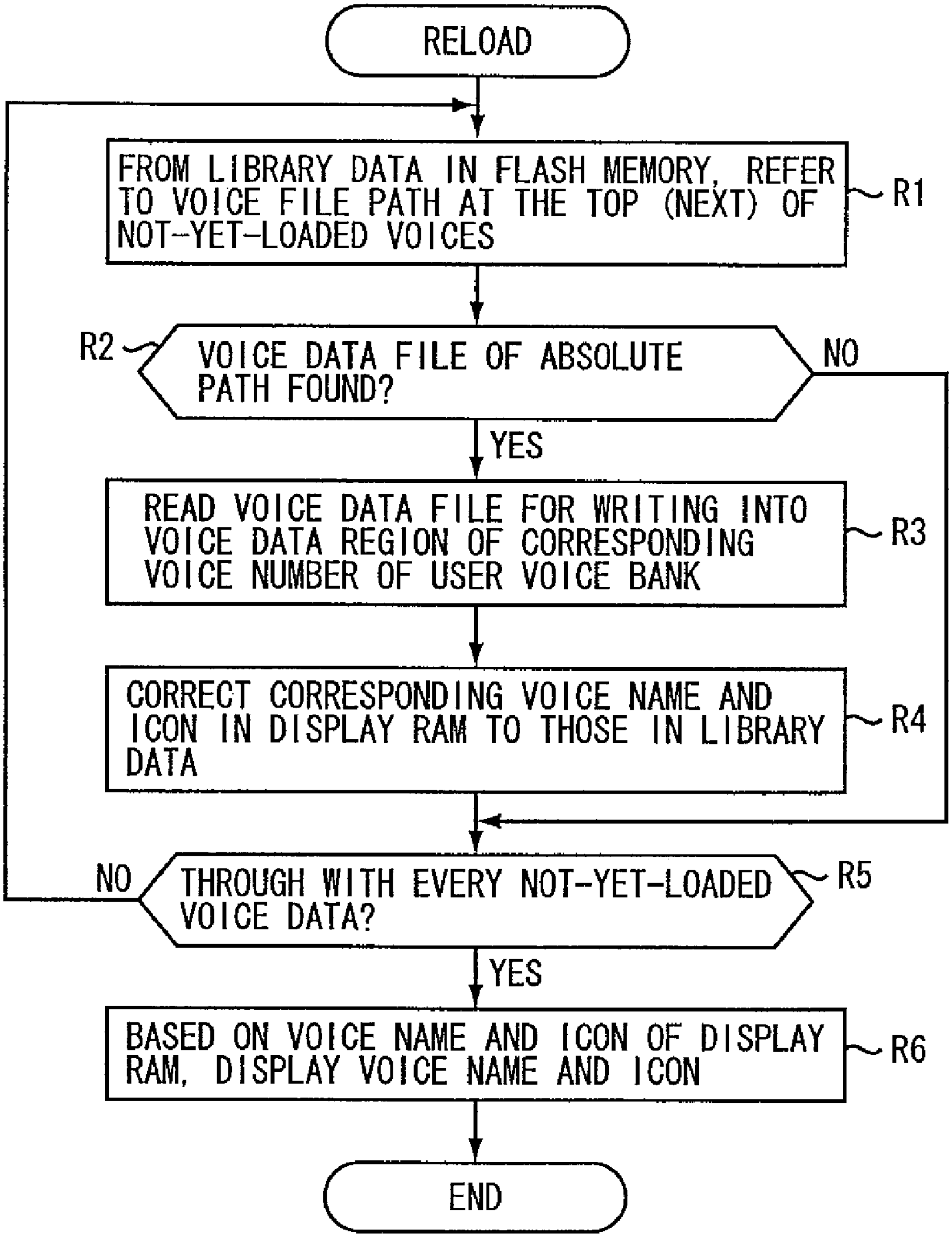
FIG. 7 is a flowchart showing the procedure of a reload process in one example of this invention.

FIG. 7 is a flowchart showing the procedure of the reload process in one example of this invention. After the library data load process of FIG. 7, this process flow can be started after taking some measure for path improvement, in the state that the "NotFound" version display is retained for the reading-failed voice on the voice display screen Vs.

Once the reload process is started, the CPU 1 first checks the library data area UL of the flash memory 4 in step R1, and extracts the voice file absolute path Pa of the library data Ldi locating at the top of the library data corresponding to not-yet-loaded voice (to-be-loaded voice data file failed in reading in the last library data load process) (step R1), and a determination is made whether the voice data file Vf instructed by the voice file absolute path Pa can be found (step R2).

Here, when the data source of the voice data file Vf can be specified and found by the voice file absolute path Pa (R2→YES), the user voice data of this voice data file Vf is read from the data source storage medium to the flash memory 4, and in accordance with the voice number Nm of the library data Ldi, the reading result is written to the voice data area UV of the corresponding voice number of the user voice bank (step R3). Thereafter, in accordance with the "voice name" and the "icon ID" of the file name information Nc of the library data Ldi, the corresponding voice name data and the icon data in the RAM for display use are corrected (step R4).

After the process of correcting the voice name and the icon (R4), or when the voice data file Vf cannot be found by the voice file absolute path Pa (R2→NO), a determination is made whether the voice data file instructed by the library data corresponding to every voice not yet loaded in the library data load process is through with the process (step R5). Here, in the meantime when the load target voice is not entirely through with the process (R5→NO), the procedure returns to step R1 to check the library data area UL, finding the voice file absolute path Pa of the library data Ldi corresponding to the next voice to be loaded, and the above-described procedure (R1 to R5) is repeated.

Thereafter, after every load target voice is through with the process (R5→YES), based on the voice name data and the icon data of the RAM for display use, the voice name and the icon are displayed on the voice display screen Vs (step R6), and this reload process is ended.

When the voice data file Vf is not found (R2→NO), in the last display step (R6), a warning display may be made indicating the loading has been failed with a display as "load failure of partial or entire voice data" depending on the level of a file location failure. Alternatively, every time the voice data is failed in loading (R2→NO), a warning display may be made to tell the failure.

To check the absolute path of the original voice data file, in response to a command coming from a user, the absolute path written in the library data in the flash memory may be displayed. This eases to put back the voice data to the original path. Note here that the operation of putting back the voice data to the original path may be executed in this electronic music apparatus, or in any other equipment (e.g., personal computer).

Another Embodiment

The voice data files sometimes store waveform data in addition to voice parameters. The wave form data requires large storage capacity, and if a voice data file including waveform data is stored in the external storage unit (e.g., USB flash memory) 14, this not only squeeze the storage capacity but also lengthens data transmission. If this is the case, as an alternative configuration, the voice data file may be collectively stored in the internal storage unit (e.g., internal hard disk) 4, and the library data file less in information amount may be stored in the external storage unit 14.

In such a configuration, a plurality of library data files may be created, and the resulting library data files may be separately stored in a plurality of external storage units 14; 14A, 14B, and others so that each different library data can be read by changing the external storage unit. In this case, because the drive letter of the internal storage unit 4 remains the same, and thus the absolute path also remains the same, thereby allowing reading of the voice data file using an absolute path. What is better, because reading is made from the internal storage unit, there is an advantage of achieving higher-speed access (reading) compared with the external storage unit.

Note that with such a configuration, the voice data file is different in drive from the library data file. Therefore, some relative path cannot access the voice data file. However, the voice data file can be correctly accessed by the absolute path so that there is no problem.

Various Embodiments

As such, one preferable embodiment of this invention is described by referring to the accompanying drawings, but this is no more than an example, and this invention can be variously modified without departing from the scope of the invention. For example, as a music data file to be read from a storage unit (storage medium) in the example, exemplified is the voice data file, but any other types of file will do. For example, the file may carry only waveform data, or may be of a data file for auto play or auto accompany play. Alternatively, a registration data file will do. With this being the case, the library data is also relating to waveform data or data about auto play, auto accompany play, registration, and others.

Moreover, although exemplified is the data created by users (user voice data), the process technique of this invention can be applied also to extension voice data provided by manufacturers, or data not created by the users, e.g., extension auto accompany play data.

As the auto load function, the library data file is automatically read when the electronic music apparatus is activated, and the voice data file written in the library data is read. Alternatively, based on an absolute path of the voice data separately stored in the flash memory, the corresponding voice data file may be automatically read when the electronic music apparatus is activated.

When the voice data file is not found, the voice name and the icon are both changed. Alternatively, either thereof may be changed, or a message may be displayed to indicate the failure in any other manner. For example, the display state of the voice name and the icon may be changed, i.e., display color or size, or background.

The library data does not necessarily include both of the absolute path (Pa) and the relative path (pr), and when the relative path cannot describe a path, the description of the relative path may be skipped. Such a case includes, for example, in the path of the voice data file, any upper folder than a folder including the library data, or when the drive is different from that of the library data file, e.g., the voice data file is in a folder of "E:/voices/", and the library data file is in a folder of "E:/user/".

About the library data load or reload process, in the example, the library data in the library data file or the not-loaded library data are thoroughly checked. As an alternative configuration, for example, any desired voice data file may be specified for loading from those displayed on the voice display screen through user specification operation.

With the first characteristics of this invention, provided is the electronic music apparatus (computer EM) that includes: a storage medium (4, 14; 14A, 14B, . . . ) storing a plurality of music data files (Vf; Vf1 to Vfn) written with music data for use in generating a music sound signal; information retention means (UL; L2) for retaining file information (Nc) for use for displaying a name (Vn) and an icon (Ic) of the music data in correspondence with the music data files (Vf); reading command means (L4) for issuing a command of reading the music data files from the storage medium (4, 14); and display control means (L3 to L12) for displaying, when the music data files are successfully read, the name (Vn) and the icon (Ic) of the music data based on the file information (Nc) (L4→L5.YES→L12), and when the music data files are failed to be read, displaying the name (Nf) and the icon (Ni) of the music data in a state different from a succeeded case (L5.NO→L7.NO→L10→L12).

Also provided is a data processing program for execution by a computer (electronic music apparatus EM) that includes a storage medium (4, 14; 14A, 14B, . . . ) storing a plurality of music data files (Vf; Vf1 to Vfn) written with music data for use in generating a music sound signal, the program including: an information retention step (L2) of retaining file information (Nc) for use in displaying a name (Vn) and an icon (Ic) of the music data in correspondence with the music data files; a reading command step (L4) of issuing a command of reading the music data files from the storage medium (4, 14); and a display step (L3 to L12) of displaying, when the music data files are successfully read, the name (Vn) and the icon (Ic) of the music data based on the file information (Nc) (L4→L5.YES→L12), and when the music data files are failed to be read, the name (Nf) and the icon (Ni) of the music data in a state different from a succeeded case (L5.NO→L7.NO→L10→L12). Herein, the terms inside of the parentheses represent reference signs and others in examples, and this is also applicable to the below.

The electronic music apparatus (EM) of this invention can be configured to further include: read-again command means (R1) operative when the music data files are failed to be read, for issuing a command of reading again the music data files from the storage medium (4, 14); and second display control means (R2 to R6) for displaying, when the music data files are successfully read this time, the name (Vn) and the icon (Ic) of the music data based on the file information (Nc).

With the first characteristics achieved by this invention, at the time of reading a music data file (Vfi: 1≦i≦n) from a storage medium (4, 14; 14A, 14B, . . . ) storing a music data file (Vf; Vf1 to Vfn) exemplified by a user voice (user timbre) data file, file information (Nc) is stored for displaying a name (Vn) and an icon (Ic) of the music data in correspondence with the music data file (Vf) (L1, L2). When such reading is succeeded, in accordance with the file information (Nc), the name (Vn) and the icon (Ic) indicating the details of the music data (Vfi) are displayed (L4→L5.YES/L7.YES→L12). When such reading is failed for the music data (Vfi), the name (Ic) and the icon (Nf) are displayed in the state different from the display with successful reading (Vn, Ic) (L5.NO→L7.NO→L10→L12). Therefore, according to this invention, users can easily check which music data file is failed to be read, and the measure thereafter can be easily taken.

Moreover, with the electronic music apparatus of this invention, when the name and the icon are displayed in the state different from the usual state due to the reading failure of the music data file (Vfi), if the music data file (Vfi) is tried to be read again and succeeded in reading after some measure is taken, in accordance with the file information (Nc), the display is changed normally to the name (Vn) and the icon (Ic) indicating the details of the music data file (Vfi). Accordingly, further the users can easily recognize that the music data file is successfully read this time.

With the second characteristics of this invention, provided is an electronic music apparatus (computer EM) that includes: a storage medium (4, 14; 14A, 14B, . . . ) storing a plurality of music data files (Vf; Vf1 to Vfn) written with music data for use in generating a music sound signal, and a guide information file (Lf: Ldi to Ldn) written with absolute path information (Pa) and relative path information (Pr) representing an absolute path and a relative path, respectively, for each of the music data files (Vf); first search means (L5) for searching one of the music data files as a target (Vfi: 1≦i≦n) based on the absolute path information (Pa); path generation means (L6) for generating, when the first search means (L5) cannot allocate the target music data file (L5→NO), another absolute path for the target music data file (Vfi) based on the absolute path (LPa) and the relative path information (Pr) of the guide information file (Lf); and second search means (L7) for searching the target music data file (Vfi) based on the generated absolute path.

Also provided is a data processing program for execution by a computer (electronic music apparatus EM) that includes a storage medium (4, 14; 14A, 14B, . . . ) storing a plurality of music data files (Vf; Vf1 to Vfn) written with music data for use in generating a music sound signal, and a guide information file (Lf: Ldi to Ldn) written with absolute path information (Pa) and relative path information (Pr) representing an absolute path and a relative path, respectively, for each of the music data files (Vf), the program including: a first search step (L5) of searching any of the music data files as a target (Vfi: 1≦i≦n) based on the absolute path information (Pa); a path generation step (L6) of generating, when the first search step (L5) cannot acquire the target music data file (Vfi) (L5→NO), another absolute path for the target music data file (Vfi) based on the absolute path (Lpa) and the relative path information (Pr) of the guide information file (Lf); and a second search step (L7) of searching the target music data file (Vfi) based on the absolute path generated in the path generation step (L6).

With the second characteristics achieved by this invention, at the time of storing a music data file (Vf; Vf1 to Vfn) such as a user voice (user timbre) data file into a storage medium (4, 14; 14A, 14B, and others), guide information file (Lf; Ld1 to Ldn) of the music data file (Vf) is stored in a data source storage medium (4, 14). Herein, the guide information file (Lf) is, at least, written with both of an absolute path (Pa) and a relative path (Pr) for allocating the music data file (Vf). At the time of reading any desired music data file (Vfi), first of all, the music data file (Vfi) is searched using the absolute path (Pa) written in the guide information file (Lf). If the absolute path (pa) fails in finding (L5→NO), the music data file (Vfi) is searched again this time using a new absolute path generated as a combining result of the relative path (Pr) written in the guide information file (Lf) and the absolute path of the guide information file (Lf) itself including the directory of the data source storage medium (Lf).

As such, according to this invention, even if the path of the music data file stored in the storage medium is changed, by deriving a new path based on a path of the data source storage medium and a relative path, the possibility of finding any desired music data file can be increased so that the possibility of a reading failure can be reduced.

What is claimed is:

1. An electronic music apparatus having a sound generator for generating a music sound signal according to a music data file, the electronic music apparatus comprising:

a data source storage that stores a guide information file;

a storage medium that stores a plurality of music data files, each being written with music data for generating a music sound signal, and that stores the guide information file, which is read from the data source storage and written with absolute path information and relative path information representing an absolute path and a relative path, respectively, for each of the music data files stored in the storage medium;

a first search section that searches a target music data file among the plurality of the music data files in the storage medium based on the absolute path information;

a path generation section that, when the first search section fails to locate the target music data file in the storage medium, generates another absolute path of the target music data file based on both of an absolute path of the guide information file and the relative path information of the target music data file;

a second search section that searches the target music data file based on the generated absolute path;

a rewriting section that rewrites the absolute path information of the target music data file written in the guide information file corresponding to the generated absolute path when the second search section locates the target music data file based on the generated absolute path;

an updating section that updates the guide information file stored in the data source storage based on the guide information file containing the absolute path information rewritten by the rewriting section; and a display control section that generates display data representing a name of the music data and an icon corresponding to the music data for displaying the name and the icon on a display device, wherein, when the second search section fails to locate the target music data file based on the generated absolute path, the display control section modifies the display data to change the name initially associated with the target music data file to a new name containing the initial name associated with the target music data file plus at least additional characters "not found" to distinguish from the name associated with the successfully read target music data file and to change the icon initially associated with the target music data file to a predetermined icon different from the icon initially associated with the target music data file.

2. A method of loading a music data file into an electronic music apparatus having a sound generator for generating a music sound signal according to a music data file, from a storage medium that stores a plurality of music data files, each being written with music data for use in generating a music sound signal, and that stores a guide information file, which is read from a data source storage and written with absolute path information and relative path information representing an absolute path and a relative path, respectively, for each of the music data files stored in the storage medium, the method comprising:

a first searching step of conducting a first search for searching a target music data file among the plurality of the music data files in the storage medium based on the absolute path information;

a path generating step of, when the first search fails to locate the target music data file in the storage medium, generating another absolute path of the target music data file based on both of an absolute path of the guide information file and the relative path information of the target music data file;

a second searching step of conducting a second search for searching the target music data file based on the generated absolute path for loading of the target music data file;

a rewriting step of rewriting the absolute path information of the target music data file written in the guide information file corresponding to the generated absolute path when the second searching step locates the target music data file based on the generated absolute path;

an updating step of that updates the guide information file stored in the data source storage based on the guide information file containing the absolute path information rewritten in the rewriting step; and a display control step of generating, for each music data file, display data representing a name of the respective music data file and an icon corresponding to the respective music data file for displaying the name and the icon on a display device, wherein, when the second searching step fails to locate the target music data file based on the generated absolute path, the display control step modifies the display data to change the name initially associated with the target music data file to a new name containing the initial name associated with the target music data file plus at least the characters "not found" to distinguish from the name associated with the successfully read target music data file and to change the icon initially associated with a predetermined icon different from the icon initially associated with the target music data file.

3. A non-transitory machine readable medium for an electronic music apparatus having a processor, a sound generator for generating a music sound signal according to a music data file, and a storage medium that stores a plurality of music data files, each being written with music data for generating a music sound signal, and that stores a guide information file, which is read from a data source storage and written with absolute path information and relative path information representing an absolute path and a relative path, respectively, for each of the music data files stored in the storage medium, the machine readable medium containing program instructions executable by the processor for carrying out:

a first searching instruction for conducting a first search for searching a target music data file among the plurality of the music data files in the storage medium based on the absolute path information;

a path generating instruction for, when the first search fails to locate the target music data file in the storage medium, generating another absolute path of the target music data file based on both of an absolute path of the guide information file and the relative path information of the target music data file;

a second searching instruction for conducting a second search for searching the target music data file based on the generated absolute path for loading of the target music data file;

a rewriting instruction that rewrites the absolute path information of the target music data file written in the guide information file corresponding to the generated absolute path when the second searching instruction locates the target music data file based on the generated absolute path;

an updating instruction that updates the guide information file stored in the data source storage based on the guide information file containing the absolute path information rewritten by the rewriting instruction; and a display control instruction for generating, for each music data file, display data representing a name of the respective music data file and an icon corresponding to the respective music data file for displaying the name and the icon on a display device, wherein, when the second searching instruction fails to locate the target music data file based on the generated absolute path, the display control instruction modifies the display data to change the name initially associated with the target music data file to a new name containing the initial name associated with the target music data file plus at least the characters "not found" to distinguish from the name associated with the successfully read target music data file and to change the icon initially associated with a predetermined icon different from the icon initially associated with the target music data file.

* * * * *